Oct. 2, 1962   J. W. MASSEY   3,056,610
VEHICLE WITH ELEVATING AND SUPPORTING MECHANISM
Filed Sept. 4, 1959   3 Sheets-Sheet 1

INVENTOR.
JOHN W. MASSEY
BY
Robert F. Ruemeli, atty.

INVENTOR.
JOHN W. MASSEY

United States Patent Office 3,056,610
Patented Oct. 2, 1962

1

3,056,610
VEHICLE WITH ELEVATING AND
SUPPORTING MECHANISM
John W. Massey, P.O. Box 97, Macon, Mo.
Filed Sept. 4, 1959, Ser. No. 838,273
9 Claims. (Cl. 280—43.18)

This invention relates to supports, and more particularly to an elevating and supporting mechanism.

The invention is applicable to elevating and supporting mechanisms generally, and particularly resilient or shock absorbing supporting mechanisms. For purposes of illustration and description the invention is applied to a boat trailer, but various aspects of the invention are equally applicable to stationary elevating supports, to devices equipped with skis or pontoons for use on snow or water, to devices supported in air as by gas bags or the like, and to many other environments in which an elevating and resilient supporting device is desirable.

Boat trailers are often equipped with a mechanism for assisting in loading and unloading a boat. Such mechanisms usually include a winch at the front end of the trailer for pulling the boat out of the water and onto the trailer, and for retarding the sliding of the boat into the water upon unloading. It is also common practice to provide the rear end of a boat trailer with tilting bars or bunks, or with a tilting boon not only to more evenly distribute the weight of the boat on its hull, but also to support the boat at an inclined angle as it is being drawn onto the trailer or is sliding from the trailer to compensate for the usual difference in elevation between the trailer bed and the water level. With conventional trailers it is normally not possible to float the boat onto or off of the trailer because the beaches and launching ramps which are suitable for loading and unloading operations normally slope very gradually into the water. Slopes with a relatively steep incline are not suitable because of the difficulty encountered in handling the trailer with the boat loaded thereon, that is, in stopping the trailer as it moves down the ramp, and pulling the loaded trailer up the ramp. The trailer frame and bed must be elevated a substantial distance above the ground to provide adequate road clearance, and the necessary road clearance plus the height of the bed makes loading and unloading of the trailer even more difficult. In pulling the trailer over rough terrain a greater amount of road clearance is necessary than is required in pulling the trailer over smooth-surfaced highways, but as the elevation of the trailer bed and the load is increased, the center of gravity is also increased, making the trailer less stable, so that a compromise is usually built permanently into a trailer.

Most modern trailers are provided with a suspension system intended for a limited range of load weight, and for absorbing shocks which would otherwise be transmitted from the road bed, through the running gear, to the frame and bed of the trailer. Such shock is normally absorbed by a resilient device of some sort such as springs or torsion bars, but it is normally not practical to vary the capacity of the resilient device to compensate for loads of different weights. For example, a very light load would normally require much lighter springs than would a heavy load. If loads of various weights are to be carried it is usually desirable to have different trailers equipped with suspension systems which are generally suitable for the intended weight of the load.

The foregoing comments regarding present-day boat trailers are generally equally applicable to all forms of trailers, and are in principle applicable to supports and loading devices generally.

2

It is therefore an object of this invention to provide an improved supporting device for raising and lowering a load.

Another object of this invention is to provide an improved resilient supporting device in which the resiliency can be easily varied in the field.

A further object of this invention is to provide an elevating and resilient supporting device which is rugged, easy to service, inexpensive to manufacture, and wherein the resiliency can be easily varied.

A further object of this invention is to provide a support having a device for varying the center of gravity of a load and for resiliently supporting the load.

A still further object of this invention is to provide a vehicle having a running gear for raising and lowering a load carrying bed and for resiliently supporting the bed at any desired elevation.

Another object of this invention is to provide a resiliently suspended load carrying vehicle with which the center of gravity of the load, and the resiliency of the suspension, may be varied.

Still another object of this invention is to provide a vehicle in which the vehicle bed can be lowered to substantially the ground level, and when so lowered special load handling devices are rendered operative.

Still another object of this invention is to provide an improved boat trailer.

Additional objects and advantages of this invention will be apparent from the following description and drawings in which.

Figure 1:
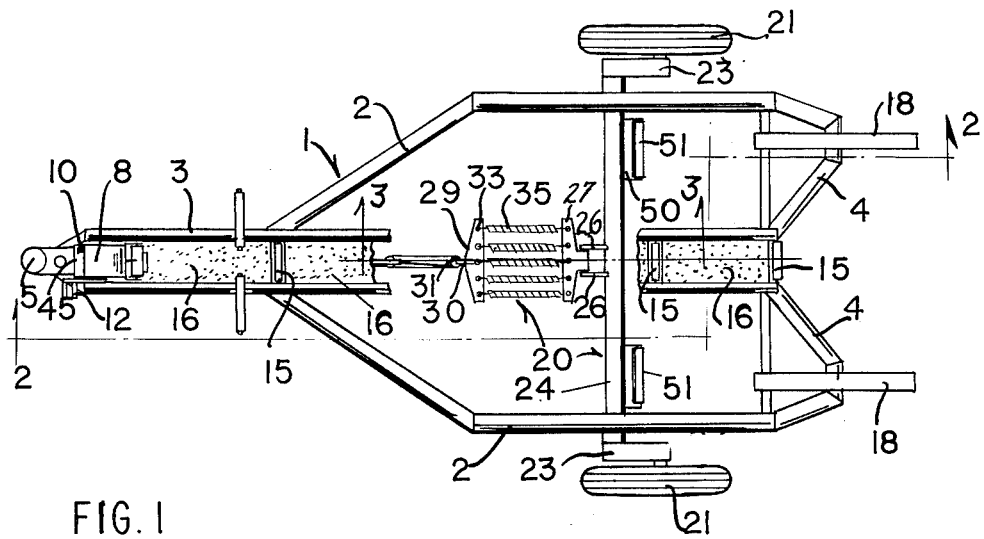
FIGURE 1 is a top view illustrating an embodiment of the invention.
Figure 4:
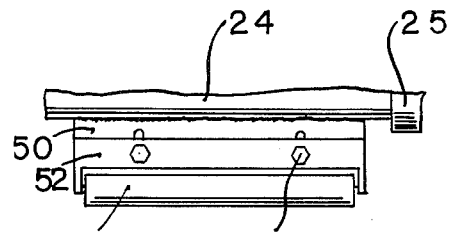
Figure 3:
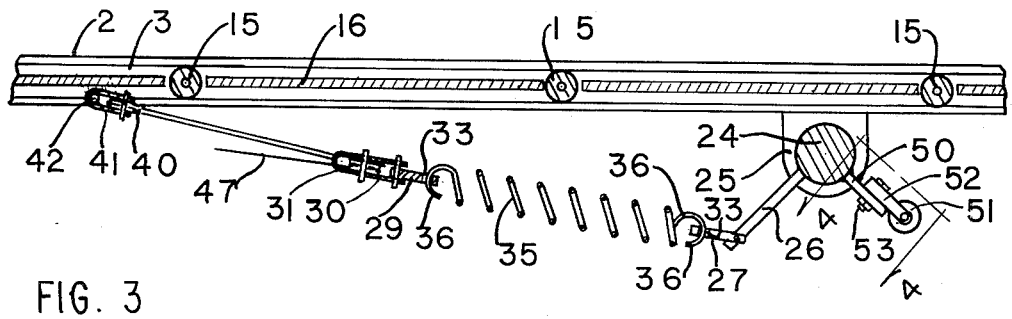
Figure 5:
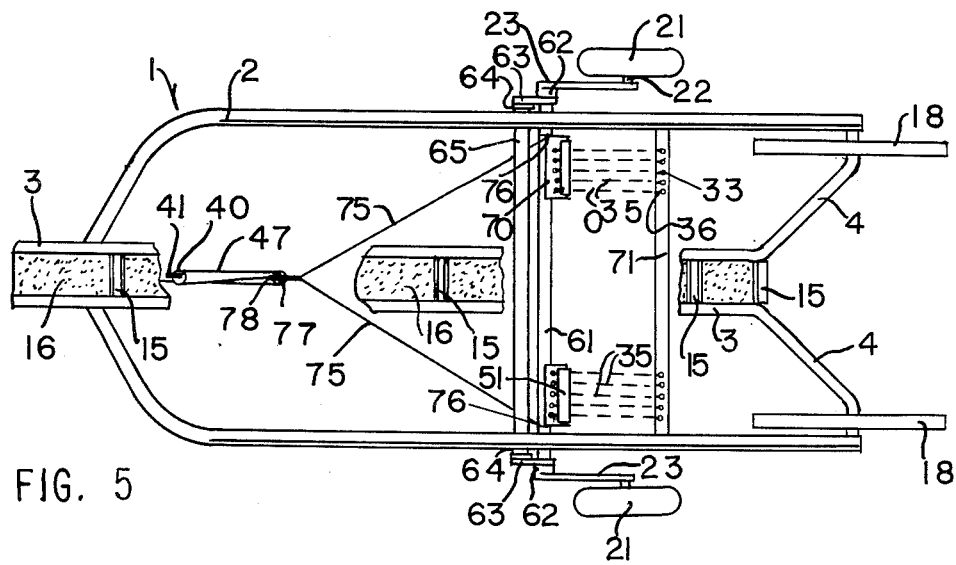
Figure 6:
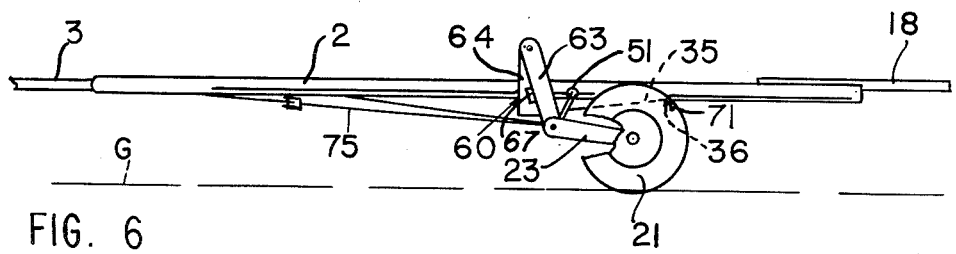
Figure 7:
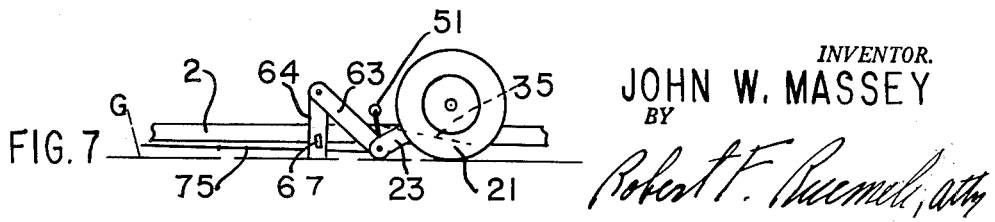
Figure 8:
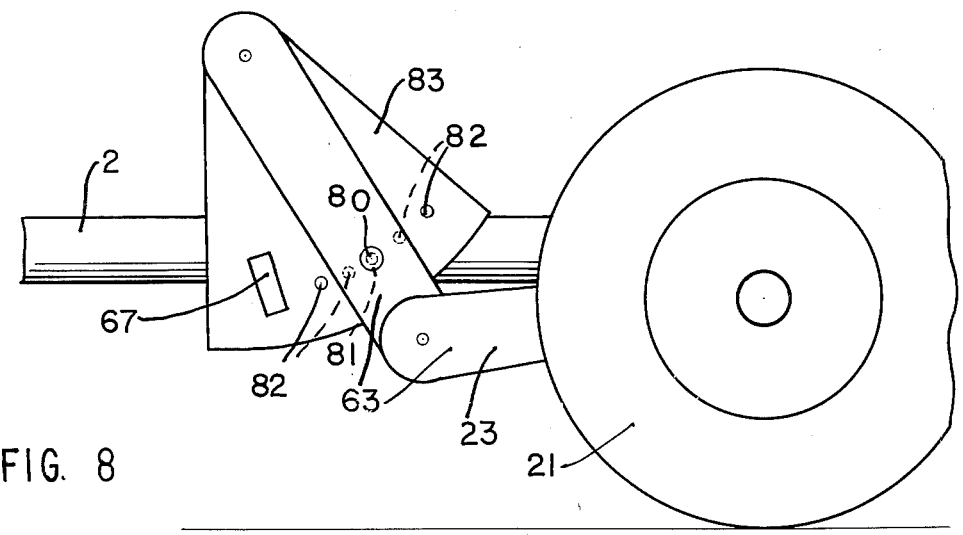
Figure 9:
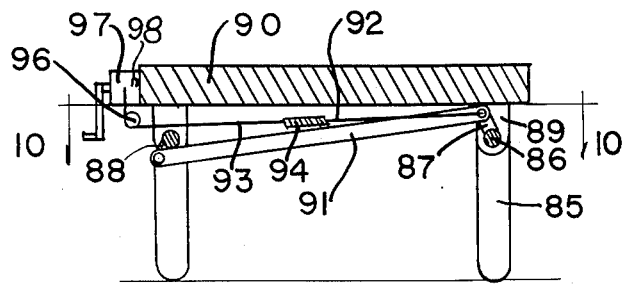
Figure 10:
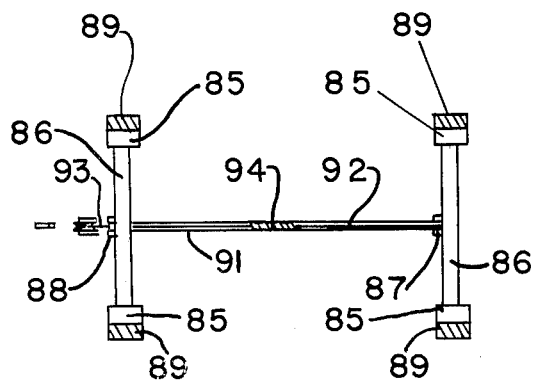

FIGURE 3 is an enlarged fragmentary sectional elevation view taken on the line 3—3 in FIGURE 1, FIGURE 4 is a fragmentary view taken on the line 4—4 in FIGURE 3, FIGURE 5 is a top view illustrating another embodiment of the invention, FIGURE 6 is an elevation view of the embodiment shown in FIGURE 5, in the fully elevated position, FIGURE 7 is a fragmentary elevation view similar to FIGURE 6, but in the fully lowered position, FIGURE 8 is an enlarged fragmentary side view, similar to FIGURE 6, and illustrating the addition of an embodiment of a locking device, FIGURE 9 is a sectional elevation view illustrating still another embodiment of the invention, and FIGURE 10 is a sectional plan view taken on the line 10—10 in FIGURE 9.

Referring to the drawings, the trailer includes tubular welded base or frame 1 having a pair of side members 2, a pair of center members 3, and a pair of end members 4 connecting respective side and center members. Secured to the center members 3 at the front end of the trailer is a conventional coupler 5. If desired the coupler 5 may be equipped with conventional braking mechanism, for actuating brakes when the trailer tends to roll forward against the towing vehicle. A conventional geared cable winch 8 is mounted on an arm 9 which is secured to the frame center members 3. The winch 8 has a cranking handle 12 and is provided with a ratchet mechanism, including an actuating finger 10, to prevent a cable or line on the winch from unwinding from the winch drum when the ratchet mechanism is engaged by positioning of the finger 10 in the locked position. The ratchet mechanism may be disengaged, to free the cable, by movement of the finger 10 in a conventional manner.

The line or cable has a hook 11 on its free end for engagement with an eye, or the like, on a boat. Mounted between center members 3 are a plurality of rollers 15 for engaging the boat keel. Between the frame center members 3 and the rollers 15 is a catwalk 16 preferably provided with a rough finish to permit a person loading or unloading the boat to safely walk across the catwalk and assist in maneuvering the boat into or out of the water. If desired, tilt bars or bunks 18, which are padded to receive the boat hull, may be pivotally mounted on the frame end members 4. As the boat is being loaded or unloaded the bunks 18 tilt, as indicated by the dotted lines in FIGURE 2 responsive to the shifting weight of the boat, and in keeping with the inclination of the boat hull to provide a larger bearing surface on the hull.

The trailer running gear, indicated generally by the reference numeral 20, includes wheels 21, resting on ground G, and mounted on axles 22 which are secured to an end of arms 23. The arms 23 are secured at an end opposite axles 22 to a shaft 24 which is journaled in a pair of journal or bearing members 25. The bearings 25 are fixed to the frame side members 2. Longitudinal movement of the shaft 24 in the bearings 25 is prevented in any conventional manner as by cooperating transverse shoulders on the shaft 24 and on the bearing or journal 25.

As may be best seen in FIGURE 3, midway between the ends of the shaft 24 are a pair of spaced-apart levers 26 fixed to the shaft 24. Pivotally mounted between the levers 26 is a spring supporting bar 27. A second spring supporting bar 29 is pivotally mounted between arms 30 which form part of a pulley housing for pulley wheel 31. The spring bar 27 is pivotally mounted between the levers 26 for pivotal movement in a vertical plane and the spring bar 29 is pivotally mounted between pulley arms 30 for pivotal movement in a horizontal plane. Each spring bar is provided with a plurality of oppositely disposed holes. Coiled tension springs 35, having hooks 36 at either end received in holes 33, are thereby mounted between the spring bars 27 and 29, and retard transmission of road shock to the frame.

The pulley 31 forms part of an actuating mechanism which also includes pulley wheel 40 mounted in pulley housing 41. Pulley housing 41 is pivotally mounted to the center frame members 3 by pin 42, for movement in a vertical plane. A second winch 45, provided with a ratcheting device controlled by an actuating finger 46 to prevent line or cable 47 from unwinding from the winch when the ratchet is engaged by the finger 46, is similar to winch 8. As illustrated, pulley wheels 31 and 40 are each provided with cable receiving grooves through which the cable 47 passes with the end of the cable secured to the housing of pulley wheel 31. The cable 47 is wound onto the winch 45, or released therefrom by rotation of winch handle 48.

Figure 2:
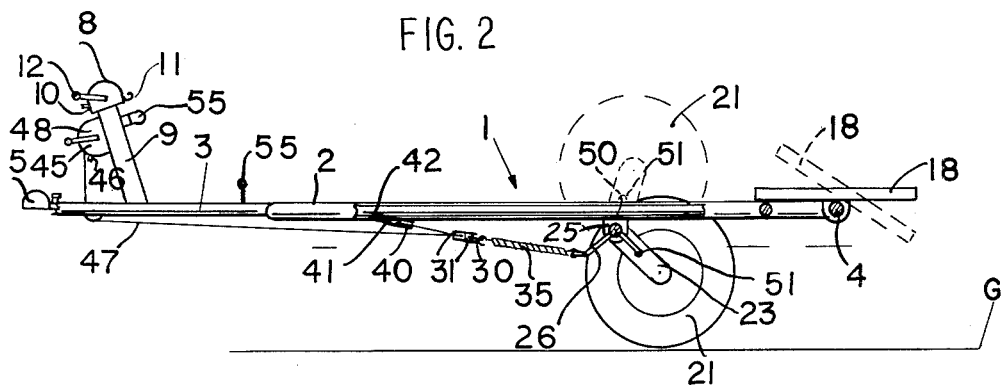
FIGURE 2 is a sectional elevation view taken on the line 2—2 in FIGURE 1.

As illustrated by the solid lines in FIGURE 2, the trailer frame 1 is in the fully elevated position and ready to be towed. Upon releasing winch finger 46 the weight of the frame 1, plus any load thereon, will cause the cable 47 to unwind from the winch 45 permitting spring bar 29 and pulley housing 30 to move rearwardly, as do springs 35, and spring bar 27, thus permitting the lever 26 to pivot counterclockwise until the frame 1 has dropped between the wheels to the position shown by the dotted wheel 21. It should be noted that the arms 23, shaft 24, and levers 26, are a fixed unit and all move together. Thus the arms 23 rotate counterclockwise as the frame 1 is being lowered. The frame 1 is normally lowered until it is resting upon the ground. The wheels 21 continue to rest on the ground, but when downward movement of the frame 1 ceases, the spring bar 29 and pulley assembly 30 will continue to move rearwardly, or toward spring bar 27 until the tension is removed from springs 35, and the springs are relaxed. Should it be desired to vary the number of springs between the spring bars, and therefore the resiliency of the suspension system, the spring hook ends 36 can be easily removed from the holes 33 in the spring bars 27 and 29. Similarly, with the trailer frame 1 in the lowered position, additional springs 35 may be added, or if desired heavier or lighter springs may be inserted. Thus the spring loading of the suspension system may be easily varied in the field and does not require any special equipment. Furthermore, coil tension springs of any type may be utilized and such springs are readily available through many sources, and therefore the trailer operator is not put to the inconvenience of delays in securing replacement springs, as normally occurs in obtaining special springs.

Fixed to the shaft 24 is a roller support 50 having secured to a free end thereof a roller 51. As best seen in FIGURES 3 and 4, the distance of the roller 51 from the center of the shaft 24 may be varied by mounting the roller on a plate 52 having a plurality of holes or slots through which mounting bolts as 53 may be positioned. As shown in FIGURE 2, when the trailer frame is lowered the arm 50 and roller 51 rotate counterclockwise above the trailer frame 1 to support the boat, or other load as it is being moved onto or off of the trailer bed. This is a particular advantage with boat-carrying trailers because the most desirable position for loading rollers is often not at all a desirable position for supports in carrying a boat on a trailer. When the frame 1 is elevated just slightly above its loading position the rollers 51 are below the frame and the boat is supported by the normal traveling position supports. The boat is normally supported in traveling position on keel rollers 15, bunks 18, and additional rollers, as rollers 55, on the front end of the trailer. The boat may be supported in chocks, in lieu of, or in addition to the rollers and bunks, all in a conventional manner. The loading rollers 51 provide the additional feature that when the trailer is in the loading position the loading rollers 51 have been brought into play to engage the hull of the boat, and as the frame is elevated to the traveling position the rollers automatically disengage the hull of the boat, all without requiring additional mechanism.

The trailer may be towed as close to the ground as the ground conditions, or the road bed, permit. As the trailer frame 1 is being elevated from the loading position by turning winch crank 48, the springs 35 are initially placed under tension, and when sufficient tension is in the springs to support the load the trailer frame 1 is elevated. Thus proper tension for resiliently supporting the load is achieved and the frame may be elevated any desired amount between the loading position and the fully elevated position, and may be towed in such intermediate position, road conditions permitting. Furthermore, should it be desired to load the trailer from a loading platform, the frame 1 may be lowered until it is exactly even with the platform, and the load may be moved onto or off of the trailer without any lifting.

FIGURES 5, 6, and 7 illustrate a preferred embodiment of the invention. Throughout the embodiment similar reference numerals as used in the embodiment of FIGURES 1–4, refer to similar parts. The winch and coupling mechanisms of the present embodiment are identical with those of the foregoing embodiment and are not illustrated. The trailer frame 1 comprises tubular welded side members 2, center members 3, and end members 4. Mounted for rotating movement between the center members 3 are rollers 15, and between the center members and the rollers is the catwalk 16. Tilt bars or bunks 18 are pivotally mounted on the end members 4. The running gear 20 includes a pair of wheels 21 mounted on axles 22 which are secured to arms 23, as previously described. All such structure is substantially as described with reference to the foregoing embodiment. This embodiment varies from the foregoing embodiment in that the arms 23 are fixed to a shaft 61 which extends across the trailer frame. The shaft 61 is pivotally mounted in journals or bearings 62 on ends of links 63. Links 63 are pivotally secured to posts 64 which are fixed to a beam 65 which traverses the frame 1 and is in turn fixed to the frame side members 2. The members 64 are each provided with a stop 67 for limiting forward movement of the links 63. The stop 67 prevents the link 63 from jumping forward past the vertical dead center position in the event that the wheel 21 should be removed from the ground while towing or lifting the trailer, responsive to the tension in springs 35.

Fixed to the shaft 61 are a pair of spring attaching levers 70 having a plurality of spring hook receiving holes 33. Fixed to the frame side members 2, as by welding, is a transverse beam 71 having a plurality of spring hook receiving holes 33 each disposed opposite one of the holes on the spring attaching levers 70. Springs 35, having hooks 36 at either end received in holes 30, are mounted between the spring attaching lever 70 and the beam 71. In the traveling position the springs 35 are under tension. Also mounted on levers 70 are rollers 51 which function as previously described, and may be adjustable. The frame elevating mechanism includes a pair of cables 75 secured to spaced-apart portions of shaft 61, as at 76. Opposite ends of the cable 75 are secured to a pulley housing 77. The pulley housing 77 is provided with a pulley wheel 78 which is equivalent to pulley wheel 31 in the modification of FIGURES 1–4. Cable 47 cooperates with pulley wheel 78 and pulley wheel 40 in housing 41 as described in the foregoing embodiment. The trailer frame 1 is elevated or lowered, respectively, by drawing in the cable 47 on the winch 45, or permitting the cable 47 to unwind from winch 45 by disengaging finger 46.

In this embodiment the running gear 60 and the trailer frame 1 may be locked in any desired intermediate position between the loading position shown in FIGURE 7 and the fully elevated position shown in FIGURE 6. With reference to FIGURE 8, this may be accomplished as by a pin 80, engaging holes 81 in links 63 and one of a plurality of holes 82 on quadrant plate 83.

In this embodiment, as in the foregoing embodiment, when the trailer is in the loading position the tension is removed from springs 35, and they may be easily removed from the holes in the spring attaching lever 70 and in the beam 71.

This invention is equally applicable to tandem trailers, and in such an embodiment each running gear may be actuated to drop one end of the trailer bed or the running gears may be actuated simultaneously to maintain the trailer frame and bed substantially parallel to the ground, as suggested in the following embodiment. Furthermore, the invention is equally applicable to vehicles equipped with skis, pontoons, or other supports in lieu of wheels 21.

In all of the foregoing embodiments, the support may be utilized for inclining the frame or bed, either by blocking an end of the frame or bed, or by locking one pair of supports in a tandem arrangement and releasing the other pair.

FIGURES 9 and 10 illustrate an embodiment of the invention incorporating tandem, simultaneously responsive pairs of supporting members. Such arrangement is applicable to the foregoing embodiments. Each pair of supporting members includes arms 85 fixed to shafts 86, with levers 87 and 88, also fixed to the shafts. The shafts 86 are journaled in blocks 89 fixed to frame or bed 90. Levers 87 and 88 are connected at their ends by a bar 91. The bar may be rigid, or if desired, it may be slightly flexible or resilient to provide some independent response for each pair of arms. Secured to the free end of lever 87 is a cable 92 which is spaced from cable 93 by a coil tension spring 94. The cable 93 passes over pulley 96 and into winch 97, similar to winches 8 or 45, previously described, and has a similar ratcheting device including finger 98 for selectively preventing unwinding of cable 93. As shown, when the cable 93 is permitted to unwind from the winch 97 the pairs of legs 85 each move inwardly, or toward each other. By securing lever 88 on the opposite side of shaft 86, that is, rotated 180 degrees, the pairs of legs 85 will move in the same direction. Spring 94 acts in the same manner as springs 35, and if it is desired to utilize a plurality for springs, spring bars as 27 and 29 may be provided.

In the embodiment of FIGURES 5–7, if it is desired to provide a tandem unit, that is, a unit with two sets of wheels, one set behind the other, it is merely necessary to duplicate the running gear from cables 75 to wheels 21, with both sets of cables 75 being secured to the same pulley housing 77.

Although this invention has been described with particular reference to certain embodiments, structural details and particular environments, various changes will be apparent to one skilled in the art and the invention is therefore not to be limited to such embodiments, structural details or any particular environment, except as set forth in the appended claims.

I claim:

1. In a vehicle having a frame with opposite sides and running gear means for moving the frame between raised and lowered positions, the combination comprising: links, one pivoted to each side of the frame for movement between a fully raised position and a lowered position of the frame, said links extending from the pivots in the same direction; a shaft having opposite end portions journaled on said links and spaced from said pivots; arms, one secured to each shaft end portion and extending from said shaft in the same direction; wheels, one rotatably mounted on each arm and spaced from said shaft; means for releasably retaining said links in raised position; means resiliently holding said shaft against rotation in a direction for resiliently supporting said frame on said wheels when said links are disposed out of lowered position toward raised position and for urging said links in a direction from raised position toward lowered position, the last said means including, at least one lever extending radially from said shaft and tension springs having opposite ends releasably connected with said lever and said frame, said springs being substantially untensioned in the lowered position; means comprising hooks on opposite ends of said springs and received in holes in said lever and frame for releasably connecting said springs with said lever and frame to facilitate adding or removing springs to vary the resilient force supporting said frame; and means for moving said links from said lowered position to said raised position and for releasably holding said links against movement to said lowered position.

2. In a vehicle having a frame with opposite sides and running gear means for moving the frame between raised running positions above the ground and a lowered position substantially at ground level for loading and unloading the vehicle, the combination comprising: links, one pivoted to each side of the frame for movement between a fully raised position and a lowered position of the frame, said links extending from the pivots in the same direction; a shaft having opposite end portions journaled on said links and spaced from said pivots; arms, one secured to each shaft end portion and extending from said shaft in the same direction; wheels, one rotatably mounted on each arm and spaced from said shaft; means for positioning said frame at various elevations and including stops, one secured to each side of said frame and abutting the adjacent link when said frame is fully raised for preventing movement of the links past the fully raised position, and latches, at least one for each link, each latch having cooperating portions on said frame and respective link for releasably holding said link between said fully raised and lowered positions; means resiliently holding said shaft against rotation in a direction for resiliently supporting said frame on said wheels when said links are disposed out of lowered position toward raised position and for urging said links from raised position toward lowered position, and including, a lever extending radially from said shaft and tension springs having opposite ends releasably connected with said lever and said frame, respectively, said springs being substantially untensioned in the lowered position; means comprising hooks on opposite ends of said springs and received in holes in said lever and frame for releasably connecting said springs with said lever and frame to facilitate adding or removing springs to vary the resilient force supporting said frame; and means for moving said links from said lowered position to said fully raised position and for releasably holding said links against movement to said lowered position.

3. In the vehicle of claim 2, said lever having an outer end at a higher elevation in the lowered position than in the raised position, and a load engaging member on the end of said lever for engaging and elevating a load on the vehicle as said frame moves to lowered positions and for lowering a load onto the vehicle and disengaging said load as said frame moves to raised position, the last said means comprising a roller.

4. In a vehicle having a frame member and running gear means for moving the frame member between raised running positions above the ground and a lowered position substantially at ground level for loading and unloading the vehicle, the combination comprising: a link pivoted to the frame member for movement between a fully raised position and a lowered position of the frame member; a shaft journaled on said link and spaced from said pivot; an arm secured to said shaft; a wheel rotatably mounted on said arm and spaced from said shaft; means for positioning said frame member at various elevations and including a stop secured to said frame member and abutting the link when said frame member is fully raised for preventing movement of the link past the fully raised position, and at least one latch having cooperating portions on said frame member and link for releasably holding said link between said fully raised and lowered positions; means resiliently holding said shaft against rotation in a direction for resiliently supporting said frame member on said wheel and for pivoting said link from raised position to lowered position when said link is disposed out of lowered position toward raised position, the last said means including, a lever extending radially from said shaft and tension springs having opposite ends releasably connected with said lever and said frame member, said springs being substantially untensioned in the lowered position; means comprising hooks on opposite ends said springs and received in holes in said lever and a part on said frame member, respectively, for releasably connecting said springs with said lever and frame member to facilitate adding or removing springs to vary the resilient force supporting said frame member; and means for moving said link from said lowered position to said fully raised position and for releasably holding said link against movement to said lowered position.

5. In a vehicle having a frame with opposite sides and running gear means for moving the frame between raised and lowered positions, the combination comprising: journals mounted one on each frame side; a shaft having opposite end portions journaled one in each journal; arms, one secured to each shaft end portion and extending from said shaft in the same direction; wheels, one rotatably mounted on each arm and spaced from shaft; means resiliently holding said shaft against rotation in a direction for resiliently supporting said frame on said wheels when the frame is disposed toward raised position from lowered position, said means including, spring mounting portions, tension springs, quick disconnect means releasably connecting said springs and spring mounting portions to facilitate adding or removing springs to vary the resilient force supporting said frame, means attaching said spring mounting portions on said shaft and frame, respectively, to maintain said springs substantially untensioned in the lowered position and tensioned when said arms are moved from lowered toward raised position and for moving said arms from lowered to raised position and releasably holding said arms against movement to said lowered position.

6. In a vehicle having a frame member and running gear means for moving said frame member between raised and lowered positions, the combination comprising: a link pivoted to the frame member for movement between raised and lowered positions of the frame member; an arm; a shaft pivotally connecting said arm and said link at a point and spaced from the first said pivot; a wheel rotatably mounted on said arm and spaced from said shaft; means for positioning said frame member in raised position and including a stop secured to said frame member and abutting the link when said frame member is raised for preventing movement of the link past the raised position; means resiliently holding said shaft against rotation in a direction for resiliently supporting said frame member on said wheel when said link is disposed out of lowered position toward raised position and for urging said link in a direction from raised toward lowered position, and including tension springs; means comprising hooks on opposite ends of said springs releasably and operably connecting said springs between said wheels and frame member to facilitate adding or removing springs to vary the resilient force supporting said frame member; and means for moving said link from lowered toward raised position.

7. In a vehicle having a frame member and running gear means for moving said frame member between raised and lowered positions, the combination comprising: a link pivoted to the frame member for movement between raised and lowered positions of the frame member; an arm pivoted on said link at a point spaced from the first said pivot; a wheel rotatably mounted on said arm and spaced from the pivot connection between said arm and link; means for adjustably releasably holding said frame member in selected raised positions and including at least latch means having cooperating portions connected with said frame member and link for releasably holding said link; means acting between said frame member and arm for resiliently supporting said frame member on said wheel; and means for moving said link from lowered to raised position.

8. In a vehicle having a frame member and running gear means for moving said frame member between raised and lowered positions, the combination comprising: a link pivoted to the frame member for movement between raised and lowered positions of the frame member; a shaft journaled on said link and spaced from said pivot; an arm secured to said shaft; a wheel rotatably mounted on said arm and spaced from said shaft; means for releasably retaining said link in raised position; means resiliently holding said shaft against rotation in a direction for resiliently supporting said frame member on said wheels in raised position and including, a lever extending transversely, from said shaft and tension springs having opposite ends releasably connected with said lever and said frame member, respectively, said springs being substantially untensioned in the lowered position; means comprising hooks on opposite ends of said springs and received in holes in said lever and frame member for releasably connecting said springs with said lever and frame member to facilitate adding or removing springs to vary the resilient force supporting said frame member; and means for moving said link from lowered to raised position.

9. In the vehicle of claim 8, said lever having an outer end at a higher elevation in the lowered position than in the raised position, and a load engaging member on the end of said lever for engaging and elevating a load on the vehicle as said frame member moves to lowered positions and for lowering a load onto the vehicle and disengaging said load as said frame member moves to raised position.

References Cited in the file of this patent

UNITED STATES PATENTS

| | | |
|---|---|---|
| 2,452,267 | Schramm | Oct. 26, 1948 |
| 2,496,599 | Rivers | Feb. 7, 1950 |
| 2,515,379 | Paine | July 18, 1950 |
| 2,595,289 | Peterson | May 6, 1952 |
| 2,621,942 | Getz | Dec. 16, 1952 |
| 2,788,908 | Lynd | Apr. 16, 1957 |
| 2,793,774 | Lovegreen | May 28, 1957 |
| 2,807,381 | Tegeler | Sept. 24, 1957 |
| 2,835,400 | Latzke | May 20, 1958 |
| 2,874,391 | Renfroe | Feb. 24, 1959 |
| 2,876,922 | Holiday | Mar. 10, 1959 |
| 2,905,481 | Schramm | Sept. 22, 1959 |
| 2,919,825 | Hornsby | Jan. 5, 1960 |
| 2,957,593 | Evans | Oct. 25, 1960 |
| 2,984,498 | Dewald | May 16, 1961 |